US006887509B2

(12) United States Patent
Leusner et al.

(10) Patent No.: US 6,887,509 B2
(45) Date of Patent: May 3, 2005

(54) PROCESS FOR TEMPERING AND MILLING GRAIN

(75) Inventors: Steven J. Leusner, Sudbury, MA (US); John G. Roufs, Maple Grove, MN (US)

(73) Assignee: General Mills, Inc., Minneapolis, MN (US)

(*) Notice: Subject to any disclaimer, the term of this patent is extended or adjusted under 35 U.S.C. 154(b) by 285 days.

(21) Appl. No.: 10/138,769

(22) Filed: May 3, 2002

(65) Prior Publication Data

US 2003/0206996 A1 Nov. 6, 2003

(51) Int. Cl.[7] .............................. A23B 9/02; A23L 1/10

(52) U.S. Cl. ....................... 426/618; 426/507; 426/615; 426/622

(58) Field of Search ................................ 426/507, 615, 426/618, 622

(56) References Cited

U.S. PATENT DOCUMENTS

| | | | | |
|---|---|---|---|---|
| 250,436 A | | 12/1881 | Gathman | |
| 1,711,574 A | * | 5/1929 | Miller | 34/475 |
| 2,614,935 A | * | 10/1952 | Dienst et al. | 426/507 |
| 3,615,655 A | | 10/1971 | Freeman et al. | 99/17 |
| 3,734,752 A | | 5/1973 | Headley | 99/233.3 |
| 4,649,113 A | | 3/1987 | Gould | |
| 4,741,913 A | | 5/1988 | Satake | 426/483 |
| 4,774,098 A | | 9/1988 | Gould et al. | |
| 4,806,475 A | | 2/1989 | Gould | 435/165 |
| 4,997,488 A | | 3/1991 | Gould et al. | |
| 5,023,103 A | | 6/1991 | Ramaswamy | |
| 5,082,680 A | | 1/1992 | Tkac | 426/483 |
| 5,089,282 A | | 2/1992 | Wellman | |
| 5,104,671 A | | 4/1992 | Wellman | 426/483 |
| 5,190,669 A | | 3/1993 | Weibel | |
| 5,194,287 A | | 3/1993 | Wellman | 426/622 |
| 5,219,601 A | | 6/1993 | Devic | 426/254 |
| 5,240,733 A | | 8/1993 | Tkac | 426/618 |
| 5,250,313 A | | 10/1993 | Giguere | 426/482 |
| 5,275,833 A | | 1/1994 | Schmidt | |
| 5,387,430 A | | 2/1995 | Tkac | 426/627 |
| 5,395,639 A | | 3/1995 | Chawan et al. | 426/557 |
| 5,480,788 A | | 1/1996 | Devic | 435/168 |
| 5,773,066 A | | 6/1998 | Satake et al. | 426/483 |
| 5,871,800 A | | 2/1999 | George et al. | |

FOREIGN PATENT DOCUMENTS

| | | |
|---|---|---|
| WO | WO 92/08842 | 5/1992 |
| WO | WO 01/17373 A1 | 3/2001 |

OTHER PUBLICATIONS

"Operating Instructions", *Buhler Ltd.*, Automatic Mill—MLU–202, (prior to 2002),pp. 1–18.

English Abstract of DE 201 246, Handreck, et al., filed Sep. 22, 1981.

English Abstract XP–002196199 of JP52–139748, Mitsubishi Gas Chemical Co., filed Nov. 21,1977.

Abstract XP–0021196200 of JP54–143544, Seiwa Kasei K.K., filed Nov. 08, 1978.

(Continued)

*Primary Examiner*—Helen Pratt
(74) *Attorney, Agent, or Firm*—John A. O'Toole; Arlene L. Hornilla; Barbara J. Clark

(57) ABSTRACT

A method of milling grain, comprising, prior to milling, heating a quantity of grain kernels to at least a glass transition onset temperature to form heated softened grain kernels is disclosed. With this method, it has surprisingly been found that moisture tempering, in most instances, is no longer required as a conditioning step for milling. Depending on the temperature to which the grain is heated, the texture of the grain kernel can be moved to a variety of textures, including, but not limited to, a more leathery or rubbery texture. In an alternative embodiment, the heat tempering step is preceded by a moisture tempering step. The method increases overall yield and improves control of the milling process.

35 Claims, 2 Drawing Sheets

OTHER PUBLICATIONS

Abstract XP–002196201 of JP53–72852, Kong Kongo KK, filed Jun. 28, 1978.

Rombauer, et al., 1975, *Joy of Cooking*, The Bobbs–Merrill Company, Inc., p. 150.

Hoseney, 1994, *Principles of Cereal Science and Technology*, Second Edition, American Association of Cereal Chemists, Inc., pp. 130–131.

* cited by examiner

PROCESS FOR TEMPERING AND MILLING GRAIN

FIELD

The present invention relates to food product processing, such as the tempering and milling of grain. More particularly, the present invention is directed towards an improved process for tempering and milling grain.

BACKGROUND

Flour milling is a mechanical method of substantially separating and size-reducing the major components of grain kernels. Wheat, for example, comprises a major starchy endosperm, a smaller germ or sprouting section of the seed and a surrounding bran or husk layer. During milling, the wheat kernel is broken open to remove as much endosperm as possible from the bran. The endosperm is then ground or reduced into flour.

Conventional flour milling for most types of grain kernels is typically preceded by a moisture tempering process that raises the moisture content of the kernels to about 10% to 14%. The moisture tempering step typically involves extended soaking times of several hours during which moisture penetrates through at least a portion of the outer bran layers, but does not entirely permeate the grain. Due to this moisture pickup, the outer bran layers become softer and thus more easily separable from the endosperm. However, the temperature of the hydrated grain is typically not closely controlled and can vary depending upon such factors as the storage condition of the grain and ambient storage temperatures, which vary greatly with seasons and mill location. Also, the temperature of the water in which the grain is soaked has an impact on grain temperature as well as the duration of the moisture tempering step. As a result, the tempering step must be carefully monitored and adjusted accordingly, in order to achieve targeted moisture levels in the grain. However, actual milling operations often fail to closely monitor or adjust targeted moisture levels for various operating reasons, such as cost or practicality. The moisture-tempered grain therefore has variable properties when fed to subsequent milling steps.

Subsequent wheat milling steps involve breaking the wheat kernel into progressively smaller fractions using a break system comprised of a pair of counter—rotating break rolls and an associated set of sieves or screens. Coarser fractions are removed by sieves and milled by a subsequent break system to progressively size-reduce the endosperm to produce flour. Each of these milling steps must also be closely monitored and constantly adjusted by skilled millers to accommodate small variations in the incoming tempered grain attributes in order to achieve the desired end products. Adjustments must also be made to each of the milling steps for seasonal or even hourly temperature variations of grain and water as well as the amount of moisture absorbed during the moisture tempering step. Adjustments must also be made at the same time for other varying properties of a natural product, such as size, variety, hardness, and so forth. Such constant fine tuning of grain milling is necessary for continuously running milling operations. However, since adjusting one grain variable in turn affects another, control of milling operations requires great skill, making the process difficult to automate.

As a result, there is a need for a milling process that is not only easier to operate and control, but produces increased yields.

SUMMARY

A method of milling grain, comprising, prior to milling, heating a quantity of grain kernels to at least a glass transition onset temperature to form heated softened grain kernels is disclosed. With this method, it has surprisingly been found that moisture tempering using added moisture is, in most instances, no longer required as a conditioning step for milling. Rather, heat tempering alone (which utilizes only the inherent moisture in the kernels) assists in removing the outer layers of the grain kernels, such as the bran layers with wheat.

In one embodiment, the moisture content of the grain kernels is measured and correlated with a previously determined glass transition onset temperature for that moisture level and grain type. It is recognized, of course, that grains are made up of a number of materials (e.g., starch, protein, cellulose, etc.) that all have a characteristic glass transition range. It is the teaching of this patent to mainly soften the structural materials of the various grains using heat and therefore it is the glass transition of the grain structural components especially bran (for example) that are important.

Generally, the previously determined glass transition onset temperature is a minimum of a temperature range, with a maximum desirable temperature being a maximum of the temperature range. The invention provides for a quantity of grain kernels to be heated to a temperature within the temperature range. In one embodiment, the grain is heated up to about five (5) ° C. above its glass transition onset temperature. In another embodiment, the grain is heated up to about 10° C. above its glass transition onset temperature. In yet another embodiment, the grain is heated more than 10° C. above its glass transition onset temperature, up to approximately 40° C. above or more. Depending on the temperature to which the wheat is heated, the texture of the grain kernel can be moved to a variety of textures, including, but not limited to, more leathery or rubbery textures. In an alternative embodiment, the heat tempering step is preceded by a traditional moisture tempering step using added moisture.

In one embodiment, the quantity of grain kernels are wheat kernels having a moisture content of about 8 to 14%, a glass transition onset temperature of about 30 to 55° C. and a maximum desirable temperature of about 60 to 70° C.

The present invention provides a means for simplifying and improving control of grain milling through heating the grain to a predetermined temperature at or above its glass transition onset temperature. Although the starting temperature of the grain from grain storage can vary seasonally from about −20° C. to over 30° C., by using the process of the present invention, all grains can now simply be heated to a predetermined temperature quickly and easily to produce an intermediate product having relatively uniform properties. The actual predetermined temperature chosen is less significant than the surprising concept of being able to control and simplify grain milling merely by heating the grain to at least its glass transition onset temperature. Specifically, at this temperature or above, up to a maximum desirable temperature, i.e., just before damage occurs to the starch and protein, it has been found that the outer layers of a grain kernel become gradually softer and more rubbery. This is highly desirable because the outer layers are not only more quickly and easily removed, but flour yields are increased.

The present invention provides an advantage over prior art methods of controlling the milling process through moisture absorption monitoring, since specific desired grain temperatures can be more easily and accurately measured, thus providing a greater degree of control. Furthermore, since flour milling is a commodity business, even small improvements (including improvements of only a few tenths of a percent increase) in flour yields can have a greatly disproportional impact on the profitability of milling operations.

The present invention provides improvements in current grain milling processes for the production of flour from various grains, including wheat useful for breads and bakery products. With respect to wheat, it has been found that the flour extraction rate can now be increased without decreasing the quality of flour by excessive bran concentration. This is unlike conventional white grain processes that seek to control bran removal through monitoring moisture absorption.

The novel process of the present invention has the advantage of saving milling time since the grain kernels can be heat tempered in just seconds rather than being subjected to traditional moisture tempering for several hours. Furthermore, milling costs per unit of flour produced is reduced since it is no longer necessary to provide the storage space necessary for tempering. It is also not necessary to subsequently dry the flour produced, such as with soft wheat flour, which eliminates yet another step, simplifying and reducing the cost of the process even further. The lack of added moisture in one embodiment of the invention also decreases the risk of microbial contamination in both the finished product and in the overall milling environment.

These and other features, aspects and advantages of the present invention will become better understood with regard to the following description, appended claims and accompanying drawings.

DETAILED DESCRIPTION

Figure 1:
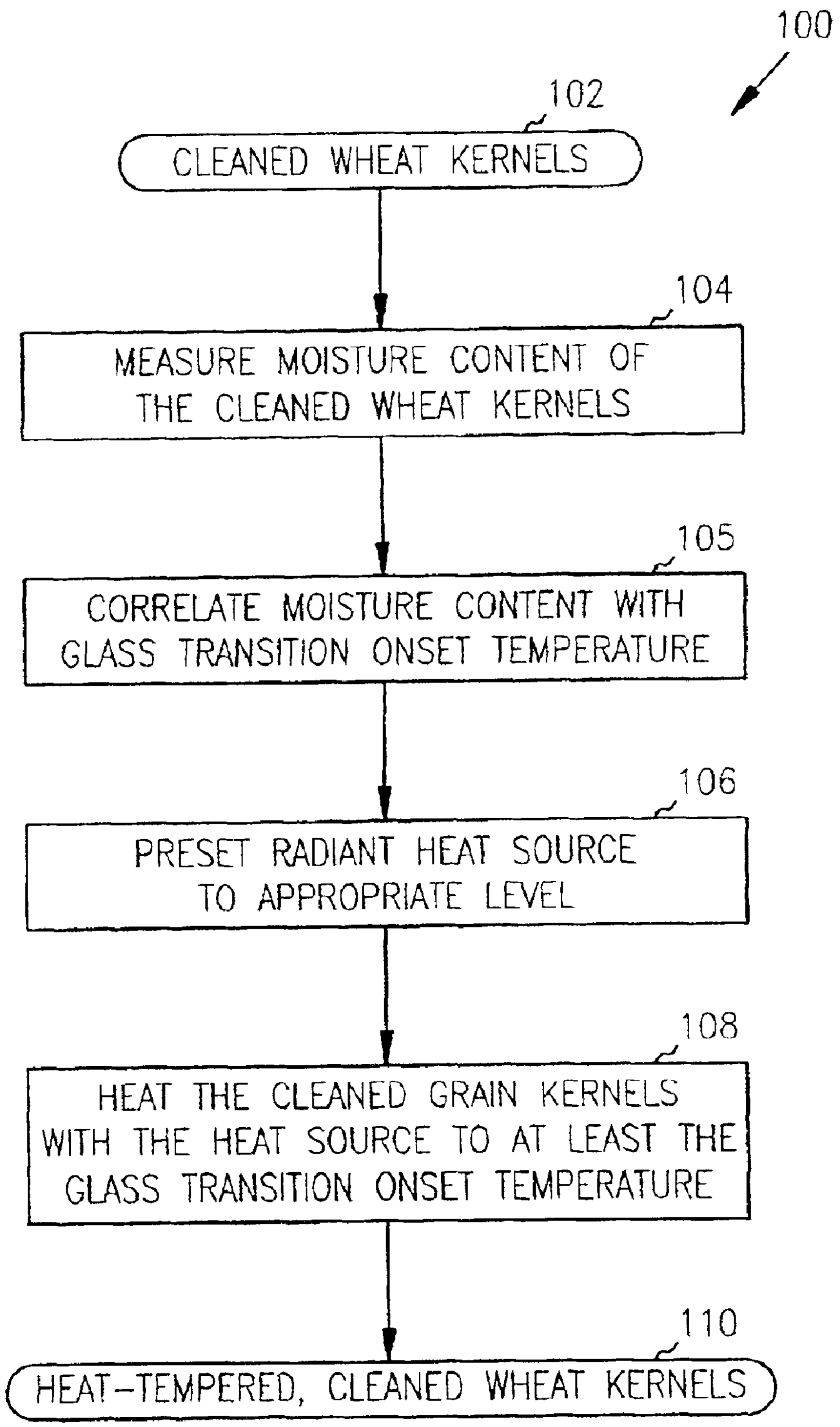
FIG. 1 is a highly schematic representation of a method for processing wheat into flour in one embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that mechanical, procedural and system changes may be made without departing from the spirit and scope of the present invention. The following detailed description is, therefore, not to be taken in a limiting sense, and the scope of the present invention is defined by the appended claims and their equivalents.

The present invention relates to milled flour, flour products and improved methods of preparation characterized by higher yields and simpler, more efficient procedures. Throughout the specification and claims, percentages are by weight and temperatures in degrees Centigrade (° C.) unless otherwise indicated. Glass transition temperature values given are as measured by a Differential Scanning Calorimeter unless otherwise noted. In the following detailed description, certain terms are defined first, followed by a brief background on wheat and milling. A description of the methods and products of the present invention is presented next, which includes examples presented for exemplary purposes only, followed by a conclusion.

Definitions

Glass Transition Temperature—Grain kernels are semi-crystalline solids having both amorphous and crystalline regions. Depending on the temperature, the amorphous regions can be either in a brittle (i.e., glassy) state or soft (leathery to rubbery) state. As used herein, the term "glass transition onset temperature" is intended to refer to the temperature at which the glass transition begins. Glass transition softening is a gradual process that begins to occur at the glass transition onset temperature, which in turn depends primarily on grain type and moisture content. As the temperature is adjusted further, the kernel continues to become even softer and more rubbery until a point of maximum softness is reached.

The term "glass transition temperature" ($T_g$) is often used loosely to refer either to the "onset" temperature or a temperature "peak" of a glass transition temperature range, or sometimes to an average temperature between the onset and peak temperatures. As used herein, however, the term "glass transition temperature," when used without qualification, is intended to refer to the glass transition "onset" temperature. Additionally, as used herein, the term "glass transition temperature range" is considered to be an operational range that begins at the glass transition "onset" temperature, i.e., the temperature at which softening begins, and continues up to a temperature just before the grain kernels burn or are otherwise detrimentally impacted, i.e., up to a "maximum desirable temperature." Although softening can continue to occur at temperatures higher than the "maximum desirable temperature" there is little reason to heat grain kernels beyond the "maximum desirable temperature" since the negative effects offset any possible benefits that could be gained from additional softening. Such negative effects include, but are not limited to, protein denaturation, starch gelatinization, and so forth, all of which can damage or degrade flour's functional properties for bread and baking applications, and in the extreme, render the final flour product inactive and of little use.

The actual numerical glass transition temperature range can vary considerably, depending on a number of factors, including, but not limited to grain type, moisture content, and so forth, but is typically not greater than about 10° C. However, the temperature range can also be as high as 40° C. or more. It should be noted that a "peak" glass transition temperature can also be defined in many ways, but is typically considered to be the temperature at which maximum softening has occurred, after which the grain kernels only become hotter. From a mechanical point of view, a "peak" temperature is considered the midpoint in the step change in heat capacity of the grain kernel. Such a midpoint can also be referred to as the "peak of tan delta." (Tan delta is the ratio of a loss modulus to a storage modulus of a given material. Tan delta is often called the "loss tangent," since it is essentially the tangent of a phase angle (delta) which represents an overall lag of the system from the input signal. Any peak in tan delta, which is particularly apparent in temperature profile studies, corresponds to a region where the material properties are changing rapidly, i.e., the material is undergoing some type of transition). The "maximum desirable temperature" of the present invention will not be greater than, and will typically be less than the "peak" glass transition temperature for any given grain kernel.

In conventional milling processes, the glass transition onset temperature of the outer layers of the grain kernel is actually lowered to at or below ambient temperatures through the addition of a plasticizer. Water is the plasticizer of choice in the milling industry as it is cheap and readily available, is a naturally occurring constituent of grain, and easily removed from the resultant flour, although any appropriately sized chemically compatible molecule will plasticize a grain kernel. Typically, the grain kernel is soaked (i.e., steeped) in water for four (4) to 30 hours, which eventually causes the brittle outer layers to become soft and rubbery and more easily removed from the kernel. However, the amount of moisture required to reach the glass transition onset temperature can vary extensively, depending in large part on the temperature of the incoming grain kernels.

In contrast, the present invention provides a novel means for reaching the glass transition onset temperature without adding moisture. Instead, the grain kernels are heated until at least the glass transition onset temperature is reached, but can be heated an additional amount to achieve further softening, i.e., up to a temperature, above which heat-induced negative effects on quality might occur. The temperature differential or range can be as large as desired to achieve the desired softening, but should always be just below the point at which irreversible heat-induced changes to the product can occur.

By selecting a specific temperature within the operational glass transition temperature range, the texture and hardness of the grain kernel, and hence, overall milling control, is controlled through application of heat in a controlled manner. One of the many advantages of this novel approach is that all of the kernel layers reach the desired glass transition temperature rather than just the outer layers, as is the case with traditional moisture tempering using added moisture.

The glass transition onset and peak temperatures can be conveniently measured using Differential Scanning Calorimetry (DSC). DSC is a well-known testing method used to study the heat capacity, phase changes and second order transitions of polymers. DSC can determine the glass transition temperatures of a material by continuing to heat it until there is a sudden step-change in heat capacity, which corresponds with the characteristic onset of glass transition, wherein the material begins to change from a glassy to a leathery to a rubbery texture. Another means for measuring the glass transition temperature range is the use of Dynamic Mechanical Analysis (DMA). In using DMA to measure the glass transition range, the peak glass transition temperature can be specified in terms of the peak in the ratio of a loss modulus divided by a storage modulus, as is known in the art. This is also referred to as the "tan delta" peak, as noted above. Yet another method for measuring glass transition temperatures is with a Wenger Phase Transition Analyzer (PTA) manufactured by Wenger Manufacturing, Inc. in Sabetha, Kans. This device does not require heating of the sample as does the DSC.

Ash Content—Wheat has an ash or mineral content that is distributed unevenly in the grain. Generally, the inner endosperm is relatively low in ash while the outer bran layers are relatively high in ash. As a result, ash content is often used to determine the presence of bran in flour and ash is commonly measured as an assay of flour quality. Ash measurements are typically performed by heating a measured weight of milled wheat product in the presence of oxygen and weighing the resulting ash as set forth in AACC Methods No. 08-01 and 08-02.

Wheat, Tempering and Milling Background

Wheat—The principle species of wheat are *Triticum aestivum* or bread wheat; T. durum which has extra hard kernels used primarily for macaroni and related pasta products; and T. compactum or club wheat, which has very soft kernels. Numerous varieties and cultivars within each species are known.

In the United States, wheat is classified according to whether it is hard or soft, white or red, and winter or spring. As a result there are eight possible designations including: hard white spring, hard red spring, hard white winter, hard red winter, soft white spring, soft red spring, soft white winter, and soft red winter.

The white or red designation refers to the color of the wheat kernel. Currently, red wheat is more readily available in the United States than white wheat. Red wheat has a distinctive taste due to the presence of high levels of certain phenolic compounds in the bran. These phenolic compounds include catechin and catechin tannins, can impart a brown or even grayish color to flour. Thus, conventional processes used to produce non-whole wheat or white products attempt to remove as much bran as possible during milling.

The hard or soft designation refers to the texture of the wheat kernel. Soft wheat is typically used in cakes and pastries while hard wheat is typically used in bread. Tannin content is also known to be lower in soft wheat than hard wheat.

The winter or spring designation refers to the growth habitat of the wheat. Winter wheat is planted in the fall and harvested in the spring, whereas spring wheat is planted in the spring and harvested later that same crop year.

As noted above, wheat comprises a major starchy endosperm, a smaller germ or sprouting section of the seed and surrounding bran or husk layers. The "endosperm" is the portion typically referred to, upon milling, as "flour" and generally makes up about 81–85% of the wheat kernel. Bran makes up about 11–15% of the kernel, with about one (1) to 3.5% being the germ portion. Bran with or without the germ is sometimes referred to as "mill feed." Mill feed is a low value commodity typically used for animal feed.

The bran portion from wheat can vary considerably in starch and fiber content. "Light" bran contains 10 to 20% starch and has a fiber content of about 38 to 48%. "Heavy" bran contains more than 20%, up to 30% starch, and has a fiber content of between about 25 to 35%. "Native" bran refers to non-treated bran, i.e., bran that has not been subjected to any chemical or physical treatment that may affect its dietary fiber content.

Further discussion of the various types of wheat is found in the Application entitled, "Bleached Grain and Grain Products and Methods of Preparation," Ser. No. 09/392,699, filed Sep. 9, 2000, commonly assigned, which is hereby incorporated by reference in its entirety.

Tempering—Tempering is a conditioning process for altering the properties of a material by adding in or mixing another substance with the material or by manipulation of other physical attributes. "Conventional moisture tempering" involves the use of an added plasticizer or surfactant, typically water or water-based, to soften grain kernels in preparation for milling. For example, wheat kernels are typically tempered with added water and/or steam and allowed to rest in temper bins for four (4) to 30 hours to toughen the bran layers and soften or mellow the endosperm. Tempering of wheat kernels is considered by most as an essential step that needs to be carried out prior to the conventional milling process. Alternately, some wheat milling processes, prior to tempering, remove most of the bran and germ to form pearled wheat, without reducing the size of the endosperm. This results in subsequent reduced tempering times.

It should be noted that the present invention can also be viewed as a type of "moisture" tempering in that the inherent moisture in the grain (in combination with added heat) is being used to temper the grain, rather than the requisite added moisture, as in conventional moisture tempering. Surprising results have been achieved simply by increasing the temperature of the grain to at least the glass transition onset temperature or above without adding moisture. Until now, the addition of heat was considered inappropriate, because at high local moisture areas in the grain kernel, negative properties can occur, e.g., protein denaturation, starch gelatinization, and so forth. In the heat tempering process of the present invention, however, not only is there no added moisture, but the grain kernels, such as wheat kernels, spend a minimal time at the higher temperature, thus substantially reducing or eliminating any possible detrimental effects due to the added heat. In other embodiments, the heat tempering of the present invention is used in conjunction with conventional moisture tempering, as an additional means of control.

Wheat Milling—Wheat milling is a mechanical method of breaking open a wheat kernel. Conventional whole wheat flour is produced by grounding "sound" wheat, i.e., wheat that is substantially free of disease or other defects, other than durum. The proportion of natural constituents, other than moisture, remain similar to the intact wheat kernel. Conventional white flour is produced when most of the bran is also separated from the endosperm. The germ fraction is usually separated from the rest of the kernel because its fat content limits the shelf life of the flour. However, some special purpose whole grain flours include not only the bran but also the germ fraction. The yield of flour or endosperm from milling is typically about 70–80%, depending, in large part, on the quality of the flour being produced. Specifically, higher yields typically contain more bran, which actually lowers flour quality due to flavor and color degradation caused by the bran. Other factors affecting yield include grain variety, milling efficiency, and so forth.

Conventionally, wheat is milled in roller mills that simultaneously remove outer bran layers and germ from the wheat kernel or berry and reduce the size of the starchy endosperm. A typical roller mill includes a sequence of counter-rotating opposed rollers that progressively break the wheat into smaller and smaller sizes. Output from each pair of rollers is sorted into multiple streams, typically by means of sifters and purifiers, to separate the bran and germ from the endosperm and to direct coarser and finer fractions of the endosperm to appropriate rollers for milling and separating into finer and purer fractions.

Exemplary Embodiments

The starting material can essentially be any type of millable grain as is known in the art. Although the processes and products described herein are primarily in terms of wheat, the processes of the present invention are also applicable to other grains, including, but not limited to, barley, corn (maize), oats, rice and mixtures thereof. Other minor useful grains include, but are not limited to, amaranth, flax, millet, sorghum, triticale and mixtures thereof. The processes of the present invention are likely also applicable to legumes, such as soybeans.

In one embodiment, the starting material is any type of wheat. If a whiter final product is desired, a whiter starting material, such as a white wheat, can be used. In one embodiment, a soft white wheat is used as the starting material. In another embodiment a hard white wheat is used that does not have any genes coding for bran color. In yet another embodiment, red wheat is used as the starting material. The starting material is cleaned in any suitable manner known in the art, such as to remove associated stones and dirt to provide clean grain.

In the embodiment shown in FIG. 1, a wheat kernel conditioning process 100 begins when cleaned wheat kernels (i.e., berries) 102 are measured 104 for moisture content. The moisture content is measured by conventional means known in the art, such as with an infrared (IR) detector or analyzer. The moisture content is then correlated 105 with a glass transition onset temperature for the cleaned wheat kernels.

This corresponding glass transition onset temperature is preferably determined prior to the start of the process 100 through a series of measurements in which the glass transition onset temperature of specific types of grain kernels having varying moisture contents is determined. In another embodiment, the maximum desirable temperature, as defined herein, is also determined prior to the start of the process 100. In yet other embodiments, temperatures between these two extremes can be correlated with various desirable final flour product characteristics such as adequate flow properties, adequate screening capabilities, high mill yield, low ash level (i.e., about 0.6% at a 70% mill yield or less than about 0.6% at a mill yield greater than 70%), low bran content, low starch damage, high throughput mill rates, and so forth, as is known in the art.

If at least the glass transition onset temperature is determined ahead of time, only the moisture content of the grain kernels needs to be determined as part of the process 100. In one embodiment, the process involves producing heated grain kernels having a temperature a specific amount above the predetermined glass transition onset temperature, such as 1–2° C. or 5–10° C. up to 40° C. or more. In other embodiments, the final temperature to which the grain kernels are heated is variable, depending on the particular final flour product desired. In one embodiment, calibration charts, prepared in advance for various types of grain kernels, legumes, and so forth, are consulted to determine the appropriate temperature as well as the appropriate system settings. Such calibration charts can merely relate moisture content to a particular level for the heat source and/or a particular amount of time for exposing the grain kernels to the heat source, etc. In another embodiment, the calibration charts additionally or alternately provide specific information on the particular glass transition onset temperature of the kernels and/or the maximum desirable temperature as defined herein.

As a result, once the moisture content is determined as part of the process 100, this information, together with any combination of information noted above, including at least the corresponding glass transition onset temperature, allows the miller to set the heat tempering equipment (e.g., heat source, conveyor, etc.,) to appropriate levels (e.g., temperatures, speeds, times, and so forth) in order to produce the desired result.

In another embodiment, determination of the glass transition onset temperature and/or maximum desirable temperature, is determined as an additional step during the process 100. In yet another embodiment, the glass transition onset temperature is determined ahead of time, but a trial and error methodology is used during the process 100 to determine the maximum desirable temperature.

In most embodiments, incoming wheat kernels have a moisture content of about 8 to 14%, although the invention is not so limited. Such kernels, however, typically have a glass transition onset temperature of about 30 to 55° C. as measured by DSC and a maximum desirable temperature of up to 70° C., although the invention is not so limited. (If it is possible to further soften the grain at temperatures in excess of 70° C. without imparting any negative effects, the maximum desirable temperature may, in some instances, be higher than 70° C.). It is recognized that in totally dry wheat, the glass transition onset temperature occurs at a much higher temperature. In contrast, in very wet wheat having a moisture content greater than about 20%, the glass transition onset temperature is understood to occur at room temperature or substantially below.

In one embodiment, shipments or lots of grain enter the facility at different moisture levels, but are stored together for a suitable amount of time to bring all of the grain kernels to approximately the same moisture level, i.e., to equilibrate the grain. Storing of grain in this manner further helps to equilibrate the grain temperature, although this is not a necessary step in the process of the present invention, as discussed herein. In another embodiment, grain lots having lower moisture content are sprayed with water to raise their moisture content to the level of other, moister lots, when multiple grain shipments of varying moisture content are intended to be processed together. In still other variations, grain lots of known, but variable, moisture contents are blended together to obtain desired "averaged" moisture levels. The blended lots are stored for times sufficient to provide desired levels of moisture equilibration before milling.

Referring again to FIG. 1, a suitable source of energy or heat is then preset 106 to an appropriate level in order to cause the cleaned grain kernels to reach at least the glass transition onset temperature, but not beyond the maximum desirable temperature. Such a heat source can have its heat output controlled by a manual or automatic thermostat capable of switching the heat source on and off, as well as setting the heat source to a particular level to maintain a given product temperature at its discharge. In most embodiments, a radiant heat source is used. Such a radiant heat source includes, but is not limited to, a microwave energy source, a convection air oven, electric heater, infrared (IR) heater, incandescent lamp, and so forth. In an alternative embodiment, the grain kernels are placed in any type of moisture-retaining oven bag prior to exposure to the radiant heat source, although this may be the most practical for smaller non-commercial or experimental runs. In most embodiments, it is desirable to agitate the kernels intermittently or continuously during exposure to the heat source in order to more evenly expose the kernels to the heat source. In one embodiment, an electrical bar heater is used as the heat source together with a vibratory pan or conveyor as the agitator. In yet other embodiments, other heat sources, such as one or more incandescent lamps, are used in combination with a kernel agitator, such as a vibratory pan or conveyor. Steam, either directly or through a heat exchange may also be an economical means to heat the wheat to its glass transition onset temperature or above.

The cleaned grain kernels are then heated 108 with the heat source until they reach the predetermined temperature, thus producing heat-tempered cleaned wheat kernels 110. Generally, it is expected that the grain kernels will spend less than one minute exposed to the heat source. In one embodiment, the grain kernels are exposed to the heat source for about five (5) to 45 seconds. In another embodiment, an electric bar heater is used as the heat source and set to a level such that a minimum incandescence level is reached, i.e., the electric wire emits visible radiation, which for the dark-adapted eye occurs at a temperature of about 390° C. In this embodiment, the kernels are provided on a vibratory conveyer, preferably in a single layer with a relatively shallow bed depth, under the electric bar heater, likely for only about 7.5 to 12 seconds. In a particular embodiment, the bed depth is less than about two (2) cm. In another embodiment, a deeper bed depth is used, thus increasing the time requirement to more than 12 seconds. In yet another embodiment, the wire is at a temperature less than incandescence. A lower temperature, however, will tend to increase the amount of time the kernels are exposed to the heat source, if the same final temperature is desired. Similarly, if the electric wire is heated above incandescence, the kernels will need to spend less time exposed to the heat source for a given final temperature.

Figure 2:
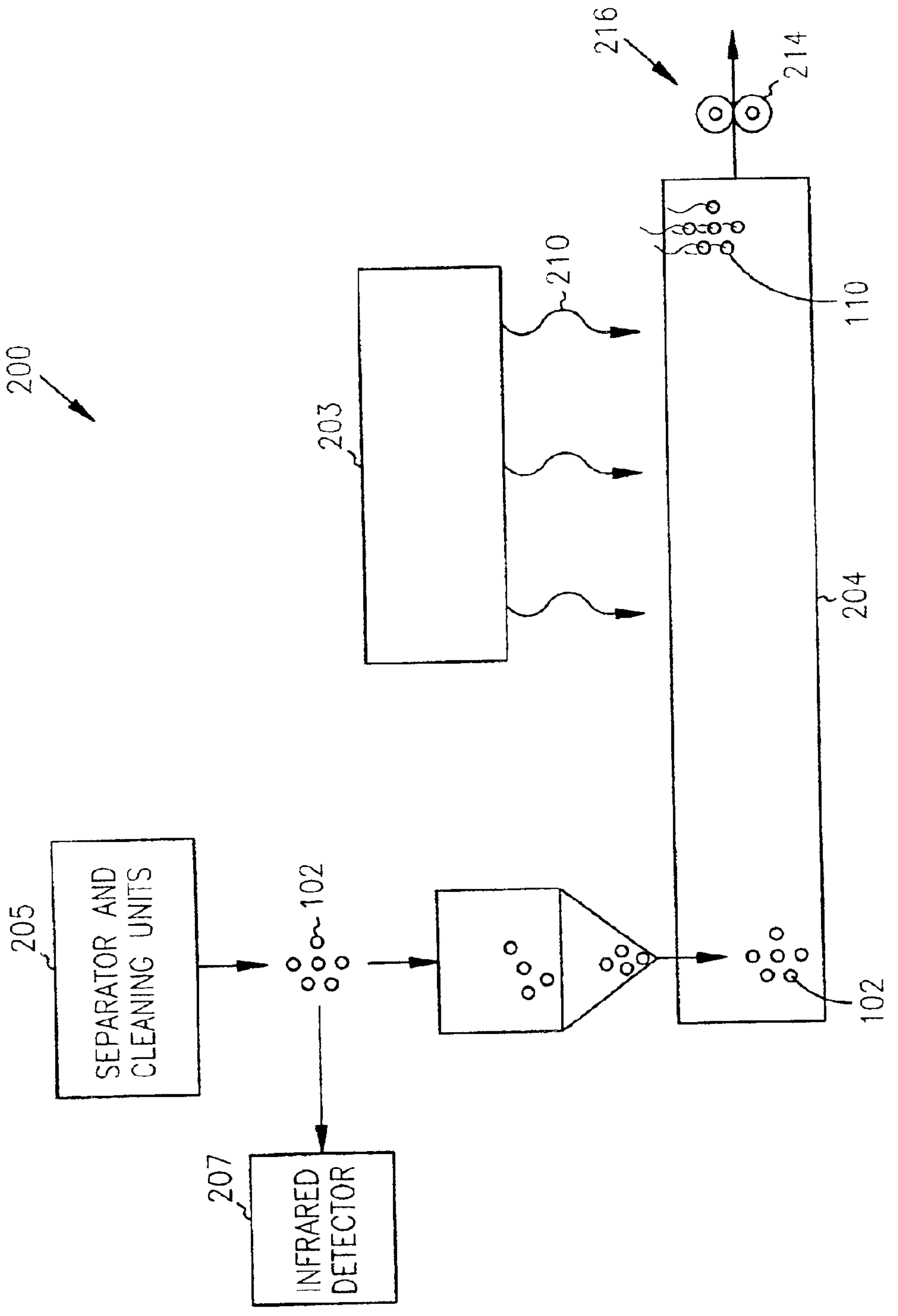
FIG. 2 is a simplified diagram of heat tempering apparatus in one embodiment of the present invention.

In a particular embodiment, as shown in FIG. 2, an electrical bar heater 203 and vibratory conveyor 204 are used as a heat tempering unit 200, although the invention is not so limited. Any combination of heat tempering equipment can be used that is capable of producing the desired result. In this embodiment, cleaned wheat kernels 102 exit separator and cleaning units 205 and are provided to a cleaned wheat kernel bin 208. In the separator and cleaning units 205, raw wheat grains have had light contaminants, such as straws and heavier contaminants, such as stones and metal pieces, removed prior to being cleaned according to accepted practice, as is known in the art. In an alternative embodiment, the wheat kernels are also processed in a polishing unit prior to entering the cleaned wheat kernel bin 208. In yet another alternative embodiment, the cleaned wheat kernels are also subjected to a conventional moisture tempering process prior to entering the bin 208.

At a suitable time during this portion of the process, a small portion of the cleaned wheat kernels 102 is provided (manually or automatically) to an infrared (IR) detector 207 to measure moisture content of the cleaned wheat kernels 102, as described above. The measured moisture content is then correlated with a previously determined glass transition onset temperature. The appropriate temperature within the glass transition temperature range is then selected and the electrical bar heater 203 is set to the appropriate setting. The cleaned wheat kernels 102 exit the cleaned wheat kernel bin 208 and are provided to the vibratory conveyor 204. The vibratory conveyor 204 serves to convey the cleaned wheat kernels 102 under the electrical bar heater 203 and to keep the wheat kernels 102 agitated. While under the electrical bar heater 203, the cleaned wheat kernels 102 are exposed to sufficient radiant heat 210 to produce the heated-tempered cleaned wheat kernels 110 described herein (See also FIG. 1). The heat-tempered cleaned wheat kernels 110 are then fed to a first break roll machine 214 in a milling unit 216, as described herein.

In an exemplary embodiment, the vibratory conveyor 204 is about 2.4 m (8 ft) by 0.9 to 1.2 m (3 to 4 ft), with the electric bar heater 203 comparable in size and situated anywhere from about 15 to 30 cm (about 6 to 12 in) above the vibratory conveyor 204. An example of this type of electric bar heater is made by Fostoria Industries Inc. in Fostoria, Ohio. One type of vibratory conveyor or pan is made by FMC Corporation of Philadelphia, Pa., although supporting framework would need to be fabricated on site and it is likely that suitable modifications would also need to be made to the purchased components to ensure their ability to withstand the requisite temperatures.

In a specific embodiment using a vibratory pan 204 that is approximately 2.4 m by one (1) m together with an electric bar heater 203 as described above, the cleaned wheat kernels 102 are hard white wheat kernels having an average initial temperature of about 21° C. (70° F.), a moisture content of about 10% and a glass transition onset temperature of about 45° C. (113° F.) as measured by DSC. In this embodiment, the electric bar heater 203 is preheated to a level such that incandescence is reached, and the kernels 102 travel on the conveyor 204 at a rate of about six (6) to 50 cm/sec (0.2 to 1.6 ft/sec), such that each kernel 102 spends anywhere from 10 to 20 seconds under the electric bar heater 203, at which point all of the kernels 102 will have reached about 50° C., i.e., about 5° C. above the glass onset transition temperature.

It is expected that, in most embodiments, the kernels 102 will generally need to be heated to at least slightly above the glass transition onset temperature in order to allow for the cooling that occurs after the kernels exit the tempering area. In this way, the kernels 102 are still above the glass transition onset temperature at the time of milling. In other embodiments, the process is designed to allow the kernels 102 to reach several degrees above the glass transition onset temperature, up to 40° C. or more, providing this is not in excess of the maximum desirable temperature. Such additional heating may be necessary in embodiments where time delays of sufficient length are expected to occur between tempering and milling, such that significant cooling of the kernels will occur. If necessary, the amount of time the cleaned wheat kernels 102 are exposed to the radiant heat 210 can be increased or decreased (e.g., by increasing or decreasing the conveyor speed), as can the intensity of the heat from the electric bar heater 203, in order to raise or lower the final temperature of the heat-tempered cleaned wheat kernels 110 exiting the area under the electric bar heater 203. In other embodiments, the size of the electric bar heater 203 may be larger or smaller, as desired. Generally, the shorter the electric bar heater, the longer the kernels need to be exposed to the heat at a given heater temperature and vice versa.

In an alternative embodiment, a conventional moisture tempering process is combined with the heat tempering process of the present invention. This may be desirable for any number of reasons, including practicality based on equipment and experience availability. This may also be necessary when the grain kernels enter the mill unusually dry, such as during a year with minimal rains and/or excessive heat, and so forth. If the moisture content of excessively dry grain kernels is not raised to at least a minimum acceptable level, e.g., about 8%, the heat required to heat temper the grain kernels successfully may otherwise cause the kernels to become scorched. It is expected that such minimal moisture tempering would take less time than conventional moisture tempering as the goal is to raise the moisture level to an acceptable minimum, not to the typical moisture levels currently seen in milling operations.

With the novel process of the present invention, temperatures of incoming wheat kernels no longer pose the types of problems previously occurring in milling operations. By heating all the kernels as described, not only do the kernels soften, all of the kernels entering the mill are now at about the same predetermined temperature, thus eliminating a previously uncontrolled process variable. Specifically, by varying the amount of heat provided to the kernel (through adjusting the heat source temperature and/or the amount of time the kernels are exposed to the heat source), the texture of the flour can be varied, which, in turn may have an effect on flour properties in a final baked product. For example, if the flour yield after the kernels pass through the first roller, i.e., the first crack, is too high for the type of flour desired, the heat tempering system can be adjusted to reduce the temperature of the kernels, thus changing the grinding characteristics of the kernels. In conventional milling operations, the only way to control flow rate beyond continually hitting the equipment to dislodge particles (particularly for soft wheats), is through adjusting the gap between the rollers, i.e., the roll gap. Furthermore, this often leads to the entire process becoming out of balance, with too much flour passing through one or more sieves at one point and not enough flour passing through other points. The process of the present invention virtually eliminates this problem, since these amounts can now be controlled simply by adjusting the temperature (as well as the roll gap, if desired) of the heat tempered kernels.

The conditioning process of the present invention also eliminates the need for an additional drying step at the end of the milling process to remove the added moisture from moisture tempering, providing yet another advantage to the milling process through simplification and reduce labor, energy, and equipment costs.

Eliminating the use of added moisture provides even further benefits for soft wheats, which tend to stick to the equipment, including the pipes, rollers, sieves (screen blinding), and so forth, causing the millers to have to continuously shake or pound on the equipment to dislodge stuck particles. By replacing the moisture tempering with heat tempering for soft wheats, in particular, this problem is virtually eliminated, further enhancing the simplicity and efficiency of the milling process.

As a result of this process, the initial yield after the flour yield after the first crack is expected to be up to twice as high as in the conventional processes. This is likely because conventional tempering softens only the outer layers of bran, with the remaining portions of the wheat kernel not taking in additional moisture and remaining relatively hard. It is estimated that, it could take up to 30 days using a conventional moisture tempering process for moisture to penetrate through to the center of the kernel. It is also possible that such moisture penetration through to the center could even take much longer or may not be able to penetrate to the center at all. In contrast, the heat provided in the present invention penetrates and softens the entire kernel almost immediately. Again, this initial yield can be reduced, if so desired, by reducing the temperature of the incoming kernels, i.e., making them less soft.

In an exemplary embodiment, a quantity of cereal grain in kernel form having a moisture content of about 10% to 14%, the cereal grain having endosperm, bran and germ fractions, as well as starch, fiber, fat, and ash components, is heated to above the onset glass transition temperature to form heated softened grain. In this embodiment, the heated softened cereal grain is milled into a predominantly endosperm flour fraction that is a finished flour having a starch content of about 69% to 91%, a fat content of about 2% to 8%, an ash content of about 0.45% to 0.8%, and a fiber content of about 2% to 8%, and at least a first high bran millfeed fraction. In yet another embodiment, the cereal grain has a moisture content of less than 10% and the first bran flour fraction comprises about two (2) to four (4) g (about 10 to 20 lbs) per 20 g (100 lbs) of the wheat, i.e., about 10 to 20% of the wheat (dry weight basis). In yet another embodiment, the finished flour has a 5–16% protein content (dry weight basis). In yet another embodiment, the finished flour is fortified with calcium in amounts sufficient to provide 0.1% to 4% total calcium. In yet another embodiment, the finished flour is enriched with at least one micro-nutrient selected from the group consisting of iron, niacin, riboflavin, thiamine and mixtures thereof to form an enriched finished flour.

The invention will be further described by reference to the following examples, which are offered to further illustrate various embodiments of the present invention. It should be understood, however, that many variations and modifications may be made while remaining within the scope of the present invention.

EXAMPLE 1

Starting Materials, Equipment and Procedures

In this experiment, hard white wheat kernels having a moisture content of about 8 to 9% were obtained from a General Mills flour mill in Vallejo, Calif. Moisture content was measured with a Computrac IR moisture analyzer, made by Arizona Instrument in Tempe, Ariz. Specifically, about 4.5 to 5.5 grams (g) of ground up wheat kernels were placed into the detector and heated until the detector sensed that the moisture was gone. The difference in weight between the original sample and dried sample represents the original moisture content and was displayed on the readout as a percent moisture by weight. The incoming wheat kernels were at a temperature of about 21° C. Wheat kernel temperature was measured by placing at least a handful of kernels into a small container and inserting a thermometer into the kernels until temperature drift was no longer evident.

The glass transition onset temperature of these kernels (at this particular moisture content) was measured using a Differential Scanning Calorimeter Model No. DSC 7, made by Perkin Elmer Corporation of Norwalk, Conn., and determined to be about 42° C.

The mill used in this experiment was a Buhler Automatic Mill MLU-202, made by Buhler Ltd. of Uzwil, Switzerland. The MLU-202 Buhler mill is a small experimental mill designed for milling small amounts of grain kernels. This mill has six reduction rollers designed to produce six different flour fractions of progressively smaller particle sizes. Two bran portions, comprised primarily of bran and wheat germ, are shunted out the back of the machine. The first bran portion is known as a bee's wing bran fraction, which comprises the largest bran pieces that split off during the first "break" session, i.e., after passing through the first reduction roller. The second bran portion contains particles of smaller sizes and is separated off after passing through a subsequent roller. Further details on its set-up and operation can be found in the "Operating Instructions—Automatic Mill MLU-202" published by Buhler Ltd., Uzwil, Switzerland, hereby incorporated by reference in its entirety.

Control Run and Results

For purposes of establishing a control run, 25.4 kg (10 lbs) of the kernels were moisture tempered in a conventional manner for about 16 hours to raise the moisture level from about 8% to about 12%. The moisture tempered kernels were then fed into the Buhler ex-mill. The total weight of the six different flour fractions produced was seven (7) lbs. This correlates with a yield of 70%.

Experimental Run and Results

An amount of wheat kernels weighing 25.4 kg (10 lbs) were heat tempered in a Reynolds brand oven bag made by Reynolds Metals Company in Richmond, Va., in a conventional radiant heat oven that had been preheated to about 93° C. (200° F.) for about 60 minutes. Upon removal, the temperature of the kernels was measured at about 88° C. This temperature is significantly higher than the measured glass transition onset temperature of about 42° C. However, with the means used to heat the kernels in this preliminary experiment, the only goal was to make sure the kernels were heated to within the glass transition temperature range.

The total weight of the six different flour fractions produced was 7.3 lbs. This correlates with a yield of 73%.

Conclusion

In the milling industry, even small improvements in yield are considered extremely important due to the commodity nature of the business. The increase in yield from 70% to 73% represents a significant increase. Furthermore, this test confirmed the ability of heat tempering alone to not only improve yields, but to also improve milling process control.

EXAMPLE 2

Starting Materials and Equipment

This experiment will use wheat kernels from a known source, which may or may not be the same source as in Example 1. As in Example 1, the moisture content will be measured at the outset. If the moisture content is not at least about 8%, all kernels will be moisture tempered using conventional moisture tempering techniques until the moisture content is sufficiently raised.

The glass transition onset temperature associated with the particular moisture content will be determined as in Example 1. Additionally, if desired, the "peak" temperature, i.e., the peak of tan delta as measured by DMA, can also be determined. Finally, the maximum desirable temperature will be determined to ensure that the grain kernels are not heated to a point at which they burn or are otherwise experiencing detrimental effects.

The Buhler ex-mill as described in Example 1 will again be used. However, rather than heating the kernels in the oven as before, it is planned that the kernels will be placed in a vibratory pan measuring about 10 by 46 cm (four (4) by 18 in). The vibratory pan will be placed on a conveyor to allow the kernels to pass under a radiant heat source comprised of an electric heater. In an initial test with a 1000-watt electric bar heater made by Casso-Solar Corporation of Pomona, N.Y., it was found that the wire and insulation types were not adequate to withstand the temperatures required, as they immediately became overheated and smoked. In the planned experiment, Super Vu-Tron III 105° C. type SJOOW wire manufactured by the Carol Cable Company and suitable insulation will be substituted.

Control Run

One or more control runs identical to the run described in Example 1 will be performed. The amounts and types of wheat kernels milled may be varied, as desired, but the same type and amount of wheat kernels will be used for each control run and its corresponding experimental run.

Experimental Run

The electric heater will be set to a predetermined level and allowed sufficient time to fully preheat. The exact heat intensity required will be dependent on the moisture content of the wheat kernels, the desired properties of the end products, and so forth, but it is expected that the incoming wheat kernels will have (or will be moisture tempered to have) a moisture content of at least about eight (8)%. It is not expected that the moisture content will be over about 11%. As a result, it is expected that the glass transition onset temperature will be between about 40 to 50° C. and the electric heater will be set to a level to deliver wheat kernels at a temperature of about 50 to 60° C.

Wheat kernels of the same type and amount as a particular control run will be placed in the vibratory pan and allowed to pass under the electric heater for about 7.5 to 12 seconds, i.e., at a rate of 50 to 100 grams per minute. It is expected that this time will be sufficient to raise the kernels to the desired temperature.

Expected Results

It is expected that the yield in the experimental runs will be consistently higher than in the control run. Again, even small increases are considered significant. Additional testing will include more detailed studies of any property differences in the final product. Yield amounts in terms of ash content will also be determined.

EXAMPLE 3

In this example, a Wenger Phase Transition Analyzer was used to measure glass transition onset temperature and peak glass transition temperature for two samples. Specifically, a coarsely ground red wheat bran obtained from Avon Inc., having about 10% starch and 13.8% moisture was determined to have a glass transition onset temperature of 43.8° C. and a peak glass transition temperature of 79.8° C. A coarsely ground white wheat bran from "Star of the West," having about 20% starch and 7.5% moisture was determined to have a glass transition onset temperature of 64.5° C. and a peak glass transition temperature of 133.8° C.

These results indicate that softening is occurring over a temperature range of about 43 to 134° C. at a moisture range of about 7 to 14%. However, as noted above, the practical maximum temperature useful in the present invention is not necessarily the "peak" temperature measured, but is the "maximum desirable temperature," i.e., a temperature above which detrimental effects can begin to occur. For example, heating grain kernels to a temperature as high as 134° C. (the peak temperature for the white wheat bran in this example) will likely cause significant detrimental effects, rendering the final product of little or no use.

Conclusion

The present invention provides a means for simplifying and improving control of grain milling through heating the grain to a predetermined temperature at or above its onset glass transition temperature. Although the starting grain from grain storage can vary in temperature seasonally from about −20 to over 30° C., by using the process of the present invention, all grains can now simply be heated to a predetermined temperature at or above the glass transition onset temperature easily and quickly to produce an intermediate bran product having relatively uniform properties. The specific predetermined temperature (i.e., likely at least slightly above the glass transition onset temperature to allow for some cooling prior to milling) is less significant than the surprising concept of being able to control and simplify grain milling merely by heating the grain in this manner. Specifically, it has surprisingly been found that heat not only penetrates faster, but more completely than moisture, thus improving milling yields anywhere from a fraction of a percent, up to three (3)% or more, by weight, for a given variety of incoming grain and outgoing flour quality, as compared with a conventional moisture tempering process. The present invention thus increases the flour extraction rate without decreasing the quality of flour by excessive bran concentration. It is also likely that the ash content in the final product is removed, and yield measurements based on ash content are also likely improved.

While the total increase in flour extraction is deceptively small, the value of the improvement is disproportionately great due to the commodity nature of the flour milling industry. Wheat flour milling is a high volume, low margin commodity business. Thus, any improvement in yield is very valuable as long as the cost of obtaining the increased yield is low. Due to the high fixed and operating costs of flour milling equipment, this seemingly small improvement in extraction can result in doubling the profitability of a flour milling plant. It is a further advantage of the present invention that the improvements can be easily practiced by existing flour milling plants with only modest equipment changes. It should be noted that in some instances, it may be more practical from an experience and equipment standpoint to use the heat tempering of the present invention in combination with a conventional moisture tempering process. Use of both tempering methods is also expected to improve yields.

Additional benefits include the ability to control mill performance by a single control point, i.e., the grain kernel temperature, versus the conventional multipoint control that includes moisture content, roll gaps, moisture tempering time, roll type, and so forth. The resulting products have better flow properties, no microbial growth-encouragement due to water addition, and overall increased mill efficiency due to these factors in aggregate.

Yet another benefit of the process described herein is the ability to create flours that exhibit either no starch damage or ultra-low starch damage. Such damage occurs in conventional milling processes due to the granules becoming fractured as a result of the harsh conditions. These granules are then cold water swellable, such that they absorb water quickly and become sticky. Since the process of the present invention uses heat to fully plasticize a grain (e.g., wheat) to the core, it is likely the starch will be released more easily, and therefore without fracture. Such flours can likely provide benefits in a number of products, such as doughs.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A method of milling grain, comprising:

prior to milling, heating a quantity of grain kernels to at least a glass transition onset temperature to form heated softened grain kernels;

measuring a moisture content of the quantity of grain kernels; and correlating the moisture content with a previously determined glass transition onset temperature.

2. The method of claim 1 wherein the previously determined glass transition onset temperature is a minimum of a temperature range and a maximum desirable temperature is a maximum of the temperature range, further wherein the quantity of grain kernels is heated to a temperature within the temperature range.

3. The method of claim 2 wherein the temperature range is between 5 and 40° C.

4. The method of claim 3 wherein the quantity of grain kernels are wheat kernels having a moisture content of about 8 to 14%, a glass transition onset temperature of about 30 to 55° C. and a maximum desirable temperature of about 60 to 70° C.

5. The method of claim 4 wherein the calibration chart further contains information on heat tempering equipment settings associated with various temperatures within the temperature range.

6. The method of claim 5 wherein the calibration chart also correlates moisture contents with previously determined maximum desirable temperatures for a plurality of grain kernel types.

7. The method of claim 5 wherein the calibration chart further contains information that correlates temperatures within the temperature range with various final flour product characteristics.

8. The method of claim 2 wherein the temperature range is in excess of 40° C.

9. The method of claim 2 wherein the grain kernels are heated to a temperature of about 1 to 3° C. above the onset glass transition temperature.

10. The method of claim 2 wherein the grain kernels are heated to a temperature of up to about 5° C. above the glass transition onset temperature.

11. The method of claim 2 wherein the grain kernels are heated to a temperature of up to about 10° C. above the onset glass transition temperature.

12. The method of claim 2 wherein the grain kernels are heated to a temperature of up to about 40° C. above the onset glass transition temperature.

13. The method of claim 2 wherein the grain kernels are heated to a specific temperature within the temperature range depending on desired final flour product characteristics.

14. The method of claim 13 wherein the desired final flour product characteristics are selected from the group consisting of adequate flow properties, adequate screening capabilities, high mill yield, low ash level, low bran content, low starch damage, high throughput mill rates and any combination thereof.

15. The method of claim 2 wherein a final flour yield, by weight, is increased in comparison with wheat kernels subjected to moisture tempering only.

16. The method of claim 2 wherein an initial flour yield after a first crack is increased by up to two times in comparison to wheat kernels subjected to moisture tempering only.

17. The method of claim 1 further wherein the moisture content is correlated with the previously determined glass transition onset temperature by viewing a calibration chart containing a plurality of moisture contents and corresponding glass transition onset temperatures for a plurality of grain kernel types.

18. The method of claim 1 wherein the quantity of grain kernels are heated by exposure to a radiant heat source.

19. The method of claim 18 wherein the radiant heat source is selected from the group consisting of an incandescent lamp, convection air oven and microwave oven.

20. The method of claim 18 wherein the radiant heat source is an electric heater.

21. The method of claim 18 wherein the quantity of grain kernels move under the electric bar heater on a vibrating conveyer.

22. The method of claim 21 wherein the quantity of grain kernels are arranged in a single layer on the vibrating conveyor.

23. The method of claim 1 wherein the quantity of grain kernels are milled to have a predetermined texture and hardness, the predetermined texture and hardness controlled through temperature adjustment of the grain kernels prior to milling.

24. The method of claim 1 wherein the grain kernels are selected from the group consisting of barley, corn, oats, rice, amaranth, flax, millet, sorghum, triticale, wheat kernels and mixtures thereof.

25. A final flour product made according to the process of claim 1.

26. A method of tempering raw kernels comprising:

measuring a moisture content of cleaned raw kernels;

correlating the moisture content with a glass transition onset temperature;

presetting a radiant heat source to a desired level designed to heat the cleaned raw kernels to at least the glass transition onset temperature; and heating the cleaned raw kernels to at least the glass transition onset temperature to produce heat-tempered, cleaned raw kernels.

27. The method of claim 26 wherein the raw kernels are grain kernels.

28. The method of claim 27 wherein the grain kernels are wheat kernels.

29. The method of claim 27 wherein the grain kernels are barley, corn, oats, rice, amaranth, flax, millet, sorghum, triticale and mixtures thereof.

30. The method of claim 27 the grain kernels are barley, corn, oats, rice, amaranth, flax, millet, sorghum, triticale, wheat kernels and mixtures thereof.

31. The method of claim 26 wherein the raw kernels are legumes.

32. The method of claim 31 wherein the legumes are soybeans.

33. A method of tempering wheat kernels comprising:

measuring a moisture content of cleaned wheat kernels;

correlating the moisture content with a glass transition onset temperature;

presetting a radiant heat source designed to heat the cleaned raw kernels to at least the glass transition onset temperature; and heating the cleaned wheat kernels to at least the glass transition onset temperature wherein heat-tempered, cleaned wheat kernels are produced.

34. The method of claim 33 wherein the cleaned wheat kernels are heated to above the onset glass transition temperature.

35. The method of claim 33 wherein the cleaned wheat kernels are not heated beyond a maximum desirable temperature.

* * * * *